US010868828B2

(12) United States Patent
Jain (10) Patent No.: US 10,868,828 B2
(45) Date of Patent: Dec. 15, 2020

(54) MITIGATION OF NTP AMPLIFICATION AND REFLECTION BASED DDOS ATTACKS

(71) Applicant: Fortinet, Inc., Sunnyvale, CA (US)

(72) Inventor: Hemant Kumar Jain, Milpitas, CA (US)

(73) Assignee: Fortinet, Inc., Sunnyvale, CA (US)

( * ) Notice: Subject to any disclaimer, the term of this patent is extended or adjusted under 35 U.S.C. 154(b) by 224 days.

(21) Appl. No.: 15/925,662

(22) Filed: Mar. 19, 2018

(65) Prior Publication Data

US 2019/0289032 A1   Sep. 19, 2019

(51) Int. Cl.
*H04L 29/06*      (2006.01)

(52) U.S. Cl.
CPC ...... *H04L 63/1458* (2013.01); *H04L 63/1416* (2013.01); *H04L 69/28* (2013.01); *H04L 63/20* (2013.01)

(58) Field of Classification Search
CPC . H04L 63/1458; H04L 69/28; H04L 63/1416; H04L 63/20; H04L 67/28; H04L 67/22; H04L 63/123
See application file for complete search history.

(56) References Cited

U.S. PATENT DOCUMENTS

| 7,339,886 | B2* | 3/2008 | Kim | H04W 56/009 |
| | | | | 370/216 |
| 8,838,817 | B1* | 9/2014 | Biswas | H04L 45/38 |
| | | | | 709/230 |
| 9,350,706 | B1* | 5/2016 | Smith | H04L 63/10 |
| 9,413,783 | B1* | 8/2016 | Keogh | H04L 63/1458 |
| 9,542,554 | B1* | 1/2017 | Salsamendi | G06F 16/1748 |
| 9,805,193 | B1* | 10/2017 | Salsamendi | G06F 21/566 |
| 2003/0145231 | A1* | 7/2003 | Poletto | H04L 63/1408 |
| | | | | 726/22 |
| 2003/0145233 | A1* | 7/2003 | Poletto | H04L 63/1458 |
| | | | | 726/22 |
| 2003/0217283 | A1* | 11/2003 | Hrastar | H04L 63/1441 |
| | | | | 726/11 |

(Continued)

OTHER PUBLICATIONS

Mills, D., et al. "Network Time Protocol Version 4: Protocol and Algorithms Specification." Internet Engineering Task Force (IETF). Jun. 2010. 110 pgs.

*Primary Examiner* — Aravind K Moorthy
(74) *Attorney, Agent, or Firm* — Jaffery Watson Mendonsa & Hamilton LLP (57) ABSTRACT

Systems and methods for mitigating DDoS attacks utilizing NTP are provided. According to one embodiment, a tracking table is maintained by a network security device protecting a private network. The tracking table contains information regarding NTP requests originated by clients of the private network and observed by the network security device. An NTP request sent from a client to an NTP server external to the private network is intercepted by the network security device. An NTP request flooding attack on the NTP server by the first client is mitigated by the network security device by: (i) determining based on the tracking table whether a prior NTP request directed to the NTP server and for which an NTP response has yet to be received was sent by the client within a predetermined or configurable time period of the NTP request; and (ii) when said determining is affirmative, dropping the NTP request.

24 Claims, 6 Drawing Sheets

(56) References Cited

U.S. PATENT DOCUMENTS

| | | | |
|---|---|---|---|
| 2004/0095926 A1* | 5/2004 | Bennett | H04L 43/0858 370/384 |
| 2007/0268938 A1* | 11/2007 | Dowd | H04J 3/0673 370/509 |
| 2008/0109891 A1* | 5/2008 | Greenwald | H04L 63/1458 726/13 |
| 2008/0159299 A1* | 7/2008 | Bu | H04L 63/10 370/400 |
| 2009/0055499 A1* | 2/2009 | Brown | G06Q 10/107 709/207 |
| 2011/0083179 A1* | 4/2011 | Lawson | H04L 63/0209 726/22 |
| 2012/0066500 A1* | 3/2012 | Ananthasubramanian | H04L 9/0825 713/171 |
| 2012/0198541 A1* | 8/2012 | Reeves | H04L 63/1441 726/13 |
| 2013/0347103 A1* | 12/2013 | Veteikis | H04L 43/04 726/22 |
| 2014/0043994 A1* | 2/2014 | Bansal | H04L 43/0894 370/252 |
| 2014/0283030 A1* | 9/2014 | Moore | H04L 63/0236 726/22 |
| 2015/0181003 A1* | 6/2015 | Kim | H04L 69/22 370/474 |
| 2015/0263966 A1* | 9/2015 | Blake | H04L 47/28 370/229 |
| 2016/0006616 A1* | 1/2016 | Pacella | H04L 41/0896 370/254 |
| 2016/0043865 A1* | 2/2016 | Matsakis | H04L 63/0428 713/168 |
| 2016/0099964 A1* | 4/2016 | Htay | H04L 63/1425 726/23 |
| 2016/0127408 A1* | 5/2016 | Miu | H04L 63/1433 726/25 |
| 2016/0239267 A1* | 8/2016 | Bos | G06F 7/4812 |
| 2017/0126734 A1* | 5/2017 | Harney | H04L 63/068 |
| 2017/0201537 A1* | 7/2017 | Caldwell | H04J 3/0667 |
| 2017/0257386 A1* | 9/2017 | Kim | H04L 63/1425 |
| 2017/0257392 A1* | 9/2017 | Ghosh | G06F 16/958 |
| 2018/0013786 A1* | 1/2018 | Knopf | H04L 9/0891 |
| 2018/0041471 A1* | 2/2018 | Sudo | H04L 63/1416 |
| 2018/0046811 A1* | 2/2018 | Andriani | H04L 63/1425 |
| 2018/0048525 A1* | 2/2018 | Karasaridis | H04L 69/165 |
| 2018/0054475 A1* | 2/2018 | Agarwal | H04L 67/42 |
| 2018/0131717 A1* | 5/2018 | Kim | H04L 43/0876 |
| 2018/0139228 A1* | 5/2018 | Kanakarajan | H04L 63/1458 |
| 2018/0191774 A1* | 7/2018 | Liang | H04L 63/1416 |
| 2018/0205476 A1* | 7/2018 | Wang | H04J 3/0655 |
| 2018/0288126 A1* | 10/2018 | Smart | H04L 43/08 |
| 2018/0367541 A1* | 12/2018 | Ponnuswamy | H04L 63/20 |
| 2018/0367652 A1* | 12/2018 | Dixit | H04L 41/12 |
| 2019/0020658 A1* | 1/2019 | Racz | H04L 63/0876 |
| 2019/0132071 A1* | 5/2019 | Matsunaga | H04L 69/28 |
| 2019/0132931 A1* | 5/2019 | Sharma | G06F 21/44 |
| 2019/0273727 A1* | 9/2019 | Eckert | H04L 63/1441 |

* cited by examiner

MITIGATION OF NTP AMPLIFICATION AND REFLECTION BASED DDOS ATTACKS

CROSS-REFERENCE TO RELATED PATENTS

This application may relate to the subject matter of U.S. Pat. No. 7,426,634 entitled, "Method and apparatus for rate based denial of service attack detection and prevention", U.S. Pat. No. 7,602,731 entitled "System and method for integrated header, state, rate and content anomaly prevention with policy enforcement", U.S. Pat. No. 7,626,940 entitled "System and method for integrated header, state, rate and content anomaly prevention for domain name service", and U.S. Pat. No. 9,729,509 entitled "System and Method for Integrated Header, State, Rate and Content Anomaly Prevention for Session Initiation Protocol" all of which are hereby incorporated by reference in their entirety for all purposes.

Copyright Notice

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright 2018, Fortinet, Inc.

FIELD

Embodiments of the present invention relate generally to mitigation of distributed denial of service (DDoS) attacks on Internet infrastructure specifically those using Network Time Protocol (NTP).

DESCRIPTION OF THE BACKGROUND ART

Based on industry surveys and published data, amplification based DDoS attacks have been growing. Amplification involves, sending a small packet to a server and getting back a much larger packet in response. If the server is open to receiving packets, it can be used to reflect spoofed attacks and send the responses back to a victim which had nothing to do with the original request. If the ratio of the response packet to the original small request packet is high, the amplification is considered high.

Common protocols which are used for reflection, include, but are not limited to, Domain Name System (DNS), NTP, Chargen, Simple Service Discovery Protocol (SSDP), Simple Network Management Protocol (SNMP), Portmap, and Structured Query Language (SQL).

When an NTP reflection attack is launched against a server it gets a barrage of packets from random sources. On this victim network, it is difficult to differentiate between which is a legitimate request or a legitimate response and therefore appliances such as firewall or Intrusion Prevention System (IPS) appliances cannot stop such attacks easily. That's because the requests or the responses on their own may sometimes be perfectly legitimate in structure according to the standards of the protocol. Clearly, a new method is needed to differentiate legitimate requests and responses from the attack packets. The purpose of such differentiation is important to isolate and sift such packets and protect the servers while allowing legitimate packets to go through.

SUMMARY

Systems and methods are described for stateful inspection of NTP requests and responses to mitigate DDoS attacks. According to one embodiment, a tracking table is maintained by a network security device protecting a private network. The tracking table contains information regarding network time protocol (NTP) requests originated by clients associated with the private network and observed by the network security device. An NTP request sent from a client to an NTP server external to the private network is intercepted by the network security device. An NTP request flooding attack on the NTP server by the client is mitigated by the network security device by: (i) determining based on the tracking table whether a prior NTP request directed to the NTP server and for which an NTP response has yet to be received was sent by the client within a predetermined or configurable time period of the NTP request; and (ii) when said determining is affirmative, dropping the NTP request.

Other features of embodiments of the present disclosure will be apparent from accompanying drawings and from detailed description that follows.

DETAILED DESCRIPTION

Systems and methods are described for mitigating DDoS attacks utilizing Network Time Protocol (NTP). According to one embodiment, a DDoS attack mitigation module comprises an apparatus that classifies NTP packets and its parameters and validates the headers for anomalies. Another component of the mitigation includes a rate monitor for multiple parameters. According to another embodiment of the invention, a meter maintains and monitors for unsolicited NTP requests. Yet another component of the mitigation system consists of an NTP request/response matching system to mitigate unsolicited responses.

Embodiments of the present disclosure may be provided as a computer program product, which may include a machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

Figure 1:
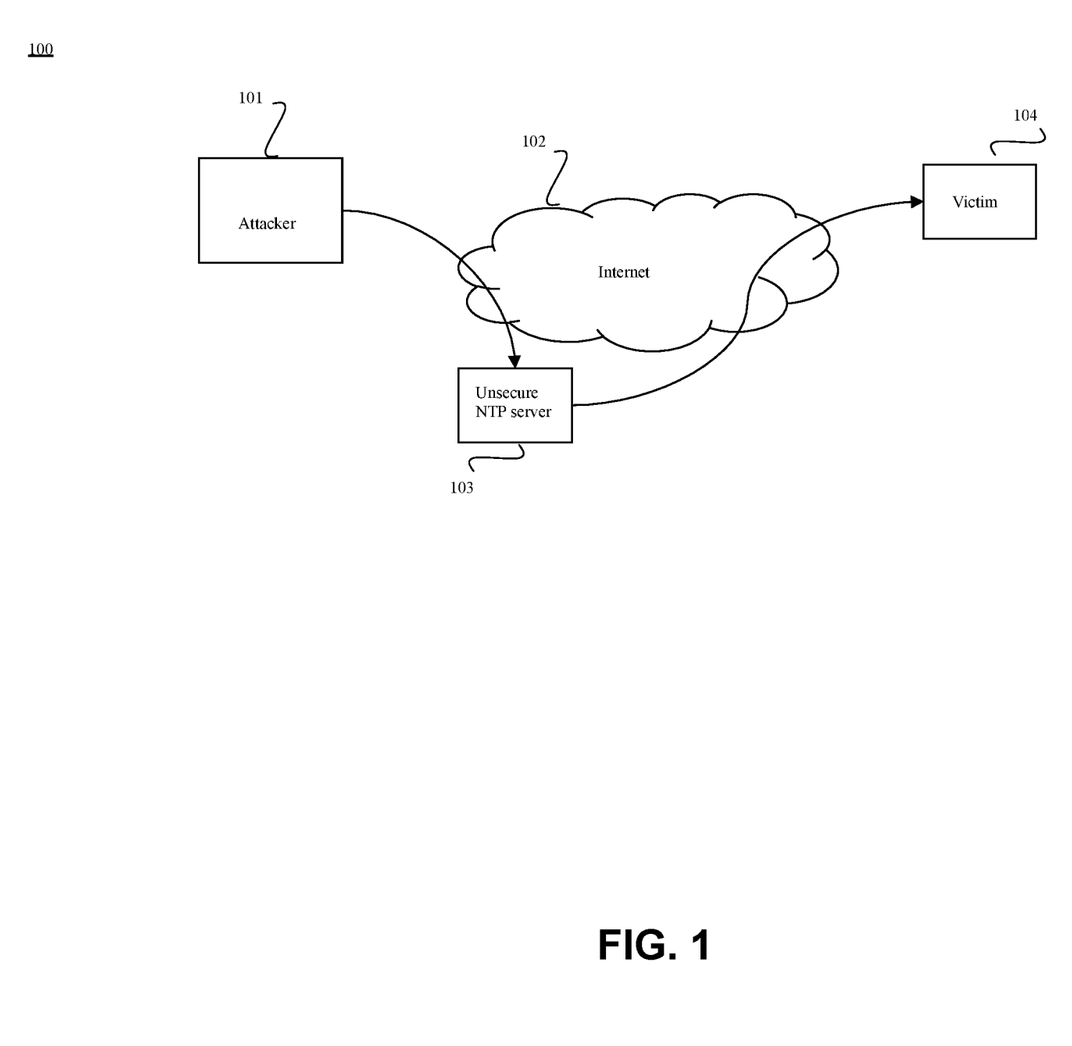
FIG. 1 illustrates an NTP reflection attack via an unsecured NTP server.

FIG. 1 illustrates an NTP reflection attack 100 in which an attacker 101 sends an unsolicited request to an unsecure NTP server 103 somewhere on the Internet 102. The request is spoofed (i.e., having a source IP address of a victim server 104) so that NTP server 103 thinks that it must send a response to victim server 104. When a multitude of such requests reach NTP server 103 from multiple compromised attackers or spoofing attackers, victim server 104 can be overwhelmed with a distributed denial of service attack using the NTP protocol.

Figure 2:
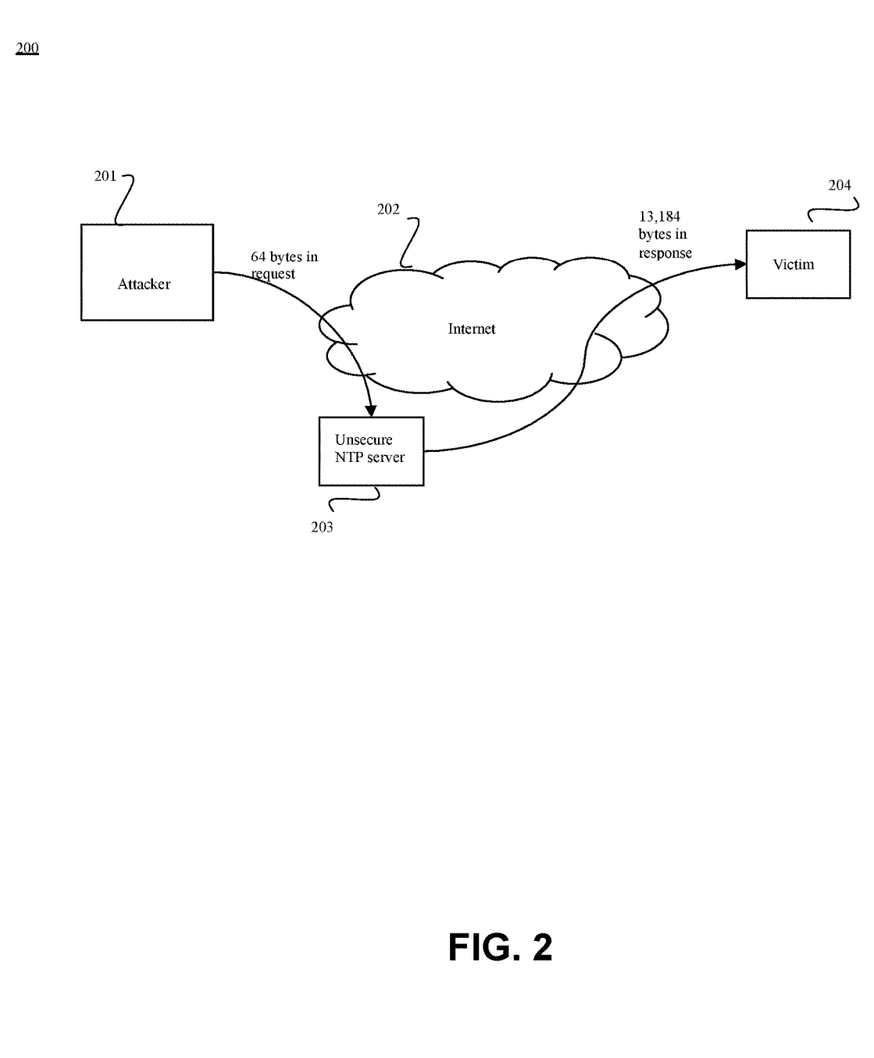
FIG. 2 illustrates the concept of amplification in NTP attacks.

FIG. 2 illustrates an NTP amplification attack 200 in which an attacker 201 sends an unsolicited request to an unsecure NTP server 203 somewhere on the Internet 202. The request is a short packet (e.g., 64-bytes). In an exemplary situation, this request may ask NTP server 203 to respond with list of past requesters. If NTP server 203 responds to such requests due to its configuration, the response size can be as large as 13,184 bytes. Additionally, due to spoofing of the request, the server 203 thinks that it must send a response to a victim server 204. Thus, a 64-byte packet causes a 13,184 bytes response directed to victim server 204. When a multitude of such requests reach NTP server 203 from multiple compromised attackers or spoofing attackers, victim server 204 can be overwhelmed with an amplified distributed denial of service attack using the NTP protocol which can totally fill its Internet pipe denying service to legitimate users.

Figure 3:
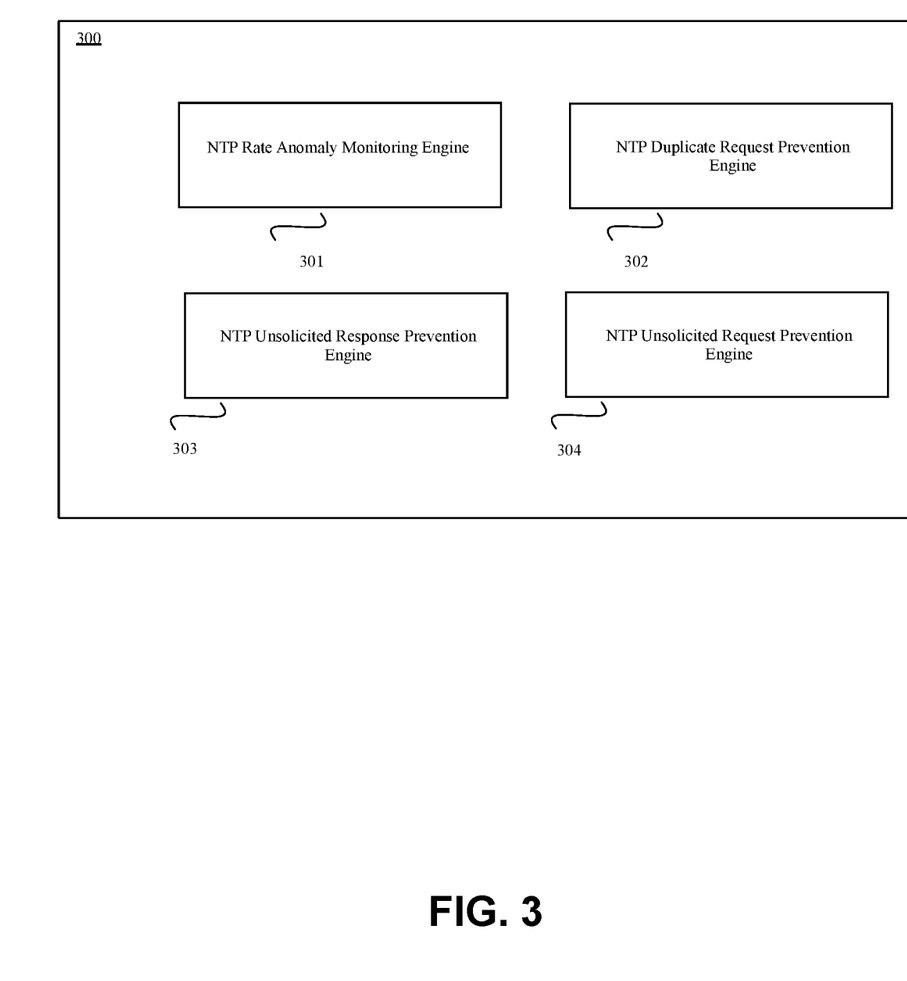
FIG. 3 illustrates the primary components for NTP DDoS attack mitigation in accordance with an embodiment of the present invention.

FIG. 3 illustrates the primary components to mitigate spoofed reflection and amplification NTP-based DDoS attacks in accordance with an embodiment of the present invention. In the context of the present example, the primary mitigation components, which may be implemented within a network security device 300, such as a transparent gateway protecting a protected network, include an NIP Rate Anomaly Monitoring Engine 301, an NIP Duplicate Request Prevention Engine 302, an NTP Unsolicited Response Prevention Engine 303 and an NTP Unsolicited Request Mitigation Engine 304, which may collectively be referred to as a NTP DDoS detection engine or module.

NTP Rate Anomaly Monitoring Engine 301 is easy to imagine for those having ordinary skill in the art and is not described here in detail. Its purpose is to monitor the rates of NTP requests, responses and determine whether the rates are above normal established rates. When the rates are higher than normal it informs the other modules of this state so that they can take extraordinary actions.

According to one embodiment NTP duplicate request prevention engine 302 determines whether a current NTP request is duplicative of an earlier NTP request observed by the transparent gateway, for example, by implementing the method described with reference to FIG. 4 (below).

According to one embodiment, NTP unsolicited response prevention engine 303 confirms an NTP response observed by the transparent gateway corresponds to an NTP request previously observed by the transparent gateway, for example, by implementing the method described with reference to FIG. 5 (below).

According to one embodiment, NTP unsolicited request prevention engine 304 tracks NTP requesters that have made NTP requests to an NTP server residing within a protected network by, for example, maintaining and using a data structure, for example, containing the information noted in Table 4 (below) to track legitimate requesters and limit responses to those legitimate requesters during an NTP request flood.

In an exemplary situation, a client sends an NTP protocol packet to a server and records the time the packet left the client in the Origin Timestamp field (T1). The server records the time the packet was received (T2). The server then assembles a response packet with the original Origin Timestamp and the Receive Timestamp equal to the packet receive time. The server sets the Transmit Timestamp to the time that the message is passed back toward the client (T3). The client then records the time the packet arrived (T4), giving the client four time measurements, as shown in Table 1. These four parameters are passed into the client timekeeping function to drive a clock synchronization function, which is described in further detail below.

TABLE 1

Key Timestamps in NTP

| Timestamp Name | ID | Generated at |
| --- | --- | --- |
| Origin Timestamp | T1 | Time request sent by the client |
| Receive Timestamp | T2 | Time request received by the server |
| Transmit Timestamp | T3 | Time reply sent by the server |
| Destination Timestamp | T4 | Time reply received by the client. |

Table 2 (below) depicts an exemplary NTP request and response packet according to the Network Time Protocol Version 4: Protocol and Algorithms Specification, Internet Engineering Task Force (IETF) Request for Comments (RFC) 5905, which is hereby incorporated by reference in its entirety for all purposes.

TABLE 2

Structure of NTP Request and Response Packets

| LI | VN | Mode | Stratum | Poll | Precision |
| --- | --- | --- | --- | --- | --- |
| Root Delay | | | | | |
| Root Dispersion | | | | | |
| Reference Identifier | | | | | |
| Reference Timestamp (64) | | | | | |
| Origin Timestamp (64) | | | | | |
| Receive Timestamp (64) | | | | | |
| Transmit Timestamp (64) | | | | | |
| Optional Extension Field 1 (variable) | | | | | |
| Optional Extension Field 2 (variable) | | | | | |
| Optional Key/Algorithm Identifier (32) | | | | | |
| Optional Message Digest (128) | | | | | |

NTP operates over the User Datagram Protocol (UDP). An NTP server listens for client NTP packets on UDP port 123. The NTP server is stateless. The server responds to each received client NTP packet in a simple transactional manner by adding fields to the received packet and passing the packet back to the original sender. The key thing to note here is that the Mode field in Table 2 has a value of 3 when the client sends the request and 4 when the server sends a response. A response should not be directed to a client if it never sent a request. In an embodiment of this invention, this fact is used to block unsolicited responses by maintaining a list of outgoing requests (e.g., those egressing a private network). Such a scheme can be useful when the NTP client is inside a protected network and the NTP server is outside the protected network. That is, the NTP requests are outbound and the NTP responses are inbound. In an embodiment of this invention, software logic, hardware logic or a combination thereof is deployed between the client and server in the form of network security device (e.g., a transparent gateway) and is therefore a party to all communication between the clients and the servers that take place via the gateway.

Table 3 (below) depicts an exemplary memory table for tracking the NTP requests and responses in an embodiment of this invention. An NTP Client Source IP, Client Source Port and NTP Server destination IP uniquely identifies a request tuple for tracking purposes. Additional parameters viz. Mode and Timeout help timeout the entry after a certain time period so that the entry doesn't perpetually remain in the memory. In one embodiment, the entry is removed either when the gateway logic observes a matching response or when the timeout occurs without the server responding. In yet another embodiment, the logic may age out and eject an entry if there is memory overflow to protect the memory based on some logic well known to those in the art such as least recently used (LRU) to make way for a new entry.

TABLE 3

| NTP Request/Response Matching Table | | | | |
|---|---|---|---|---|
| Index | Client IP Address | Client Source Port | Server Destination IP | Timeout |
| 0 | a.b.c.d | x | x | t |
| 1 | : | | | |
| : | : | | | |
| : | : | | | |
| : | : | | | |
| : | : | | | |
| 2^n | : | | | |

The hardware implementation of such tables is well known to those in the art and therefore is not described here for brevity and may be implemented using schemes such as hash-based addressing using a large dynamic random access memory (DRAM). Since IP addresses can be 32-bits and 128-bits wide, but the table depth is limited to $2^n$ available spaces—as shown in Table 3, a hash based scheme is known to work well.

According to an embodiment of this invention, a 3-tuple consisting of IP address, Source Port and the Destination IP can be converted to a hash using algorithms, including, but not limited to, Message Digest algorithm 5 (MD5), Secure Hash Algorithm (SHA) (e.g., SHA-1, SHA-2, SHA-3, SHA-256, SHA-512), Cyclic Redundancy Check (CRC) (e.g., CRC32). The depth of this table depends on the number of bits in the hash. For example, if the hash has 20 bits, the table can have 1 M entries. This 3-tuple is used to index and thus search for an incoming tuple to perform a duplicate check or an absence check.

Figure 4:
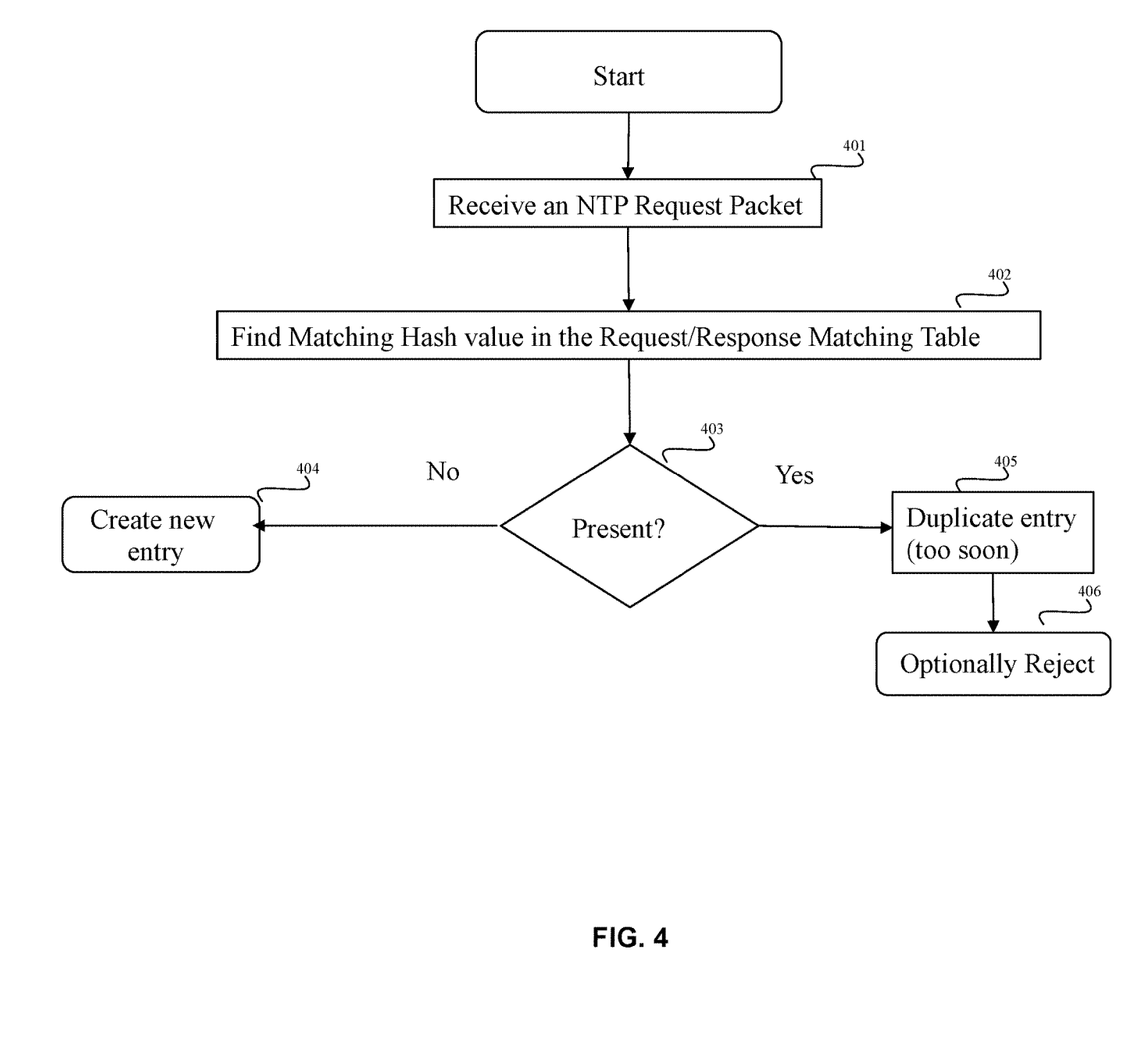
FIG. 4 is a flow diagram illustrating a method of detecting and mitigating duplicate NTP requests from the same source IP address in accordance with an embodiment of the present invention.

FIG. 4 is a flow diagram illustrating a method of processing an NTP request in accordance with an embodiment of the present invention.

At block 401, an NTP request packet is received from a Source IP address, with a Source UDP port and with a Destination IP address.

At block 402, this 3-tuple is used to find the presence of an existing entry in an NTP request and response tracking table (e.g., the NTP request/response matching table of Table 3 described above).

At block 403, if the 3-tuple does not exist in the table, a new entry is created at block 404.

If the 3-tuple is already present in the table at block 405, it means a request associated with this 3-tuple has already been observed and this duplicate request may represent a possible attack or misbehavior from a client. This ensures that any single IP address cannot send consecutive NTP requests to the same NTP sever too soon (e.g., within a predefined and/or configurable time period) when a request is already pending. This avoids scripted attacks which simply flood an NTP server with requests one after another.

Depending on the administrator's choice, such NTP requests may be discarded and not allowed to reach the destination NTP server by block 406.

Figure 5:
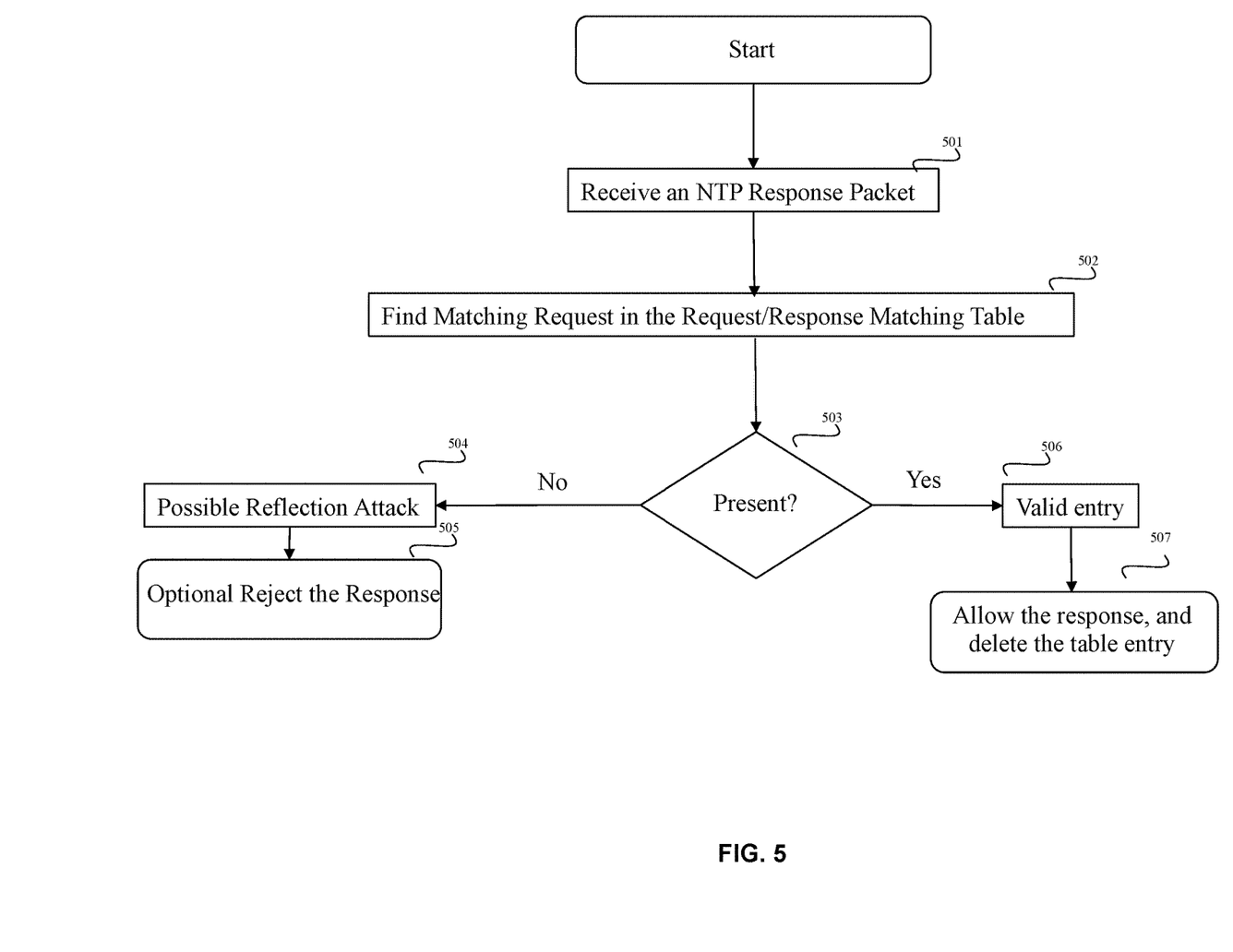
FIG. 5 is a flow diagram illustrating a method of mitigating unsolicited NTP response floods in accordance with an embodiment of the present invention.

FIG. 5 is a flow diagram illustrating a method of processing an NTP response in accordance with an embodiment of the present invention.

At block 501, an NTP response packet is received from a Source IP address, with a Source UDP port and with a Destination IP address.

At block 502, this 3-tuple is used to find the presence of an existing entry an NPT request and response tracking table (e.g., the NTP request/response matching table of Table 3 described above).

At block 503, if the 3-tuple does not exist in the table, it implies a possible reflection attack since no request was observed by the gateway. Such a response thus can be optionally dropped at block 505 by the gateway depending on the administrator's choice.

When the 3-tuple is already present in the table at block 506, it means a request has been observed traversing the gateway. Therefore, the corresponding response is allowed to pass through and the entry is deleted from the NTP request and response tracking table.

Table 4 (below) depicts an exemplary memory table for tracking NTP requesters in an embodiment of this invention. When a protected NTP server (e.g., one residing within a protected network protected by a transparent gateway implementing the DDoS mitigation techniques described herein) responds positively to an NTP Client Source IP, an entry is added to this table for that source IP. These source IPs are considered legitimate requesters. In one embodiment, the entry is removed when a timeout occurs, the timeout being controlled by a setting by the administrator. In yet another embodiment, the logic may age out and eject an entry if there is memory overflow to protect the memory based on some logic well known to those in the art such as least recently used (LRU) to make way for a new entry.

TABLE 4

Legitimate NTP Requester IP Tracking Table

| Index | Client IP Address | Timeout |
|---|---|---|
| 0 | a.b.c.d | t |
| 1 | : | : |
| : | : | : |
| : | : | : |
| : | : | : |
| : | : | : |
| $2^n$ | : | : |

The purpose of Table 4 is to let only legitimate IP addresses issue NTP requests during a period when too many requests are being seen by the gateway. That is during an NTP request flood. This reduces the load on the NTP server by a scheme of selection. The threshold for such number of requests may be set behaviorally based on past data by Rate Anomaly Monitoring Engine 301. This scheme allows the gateway to restrict un-solicited NTP requests during an NTP request flood.

Figure 6:
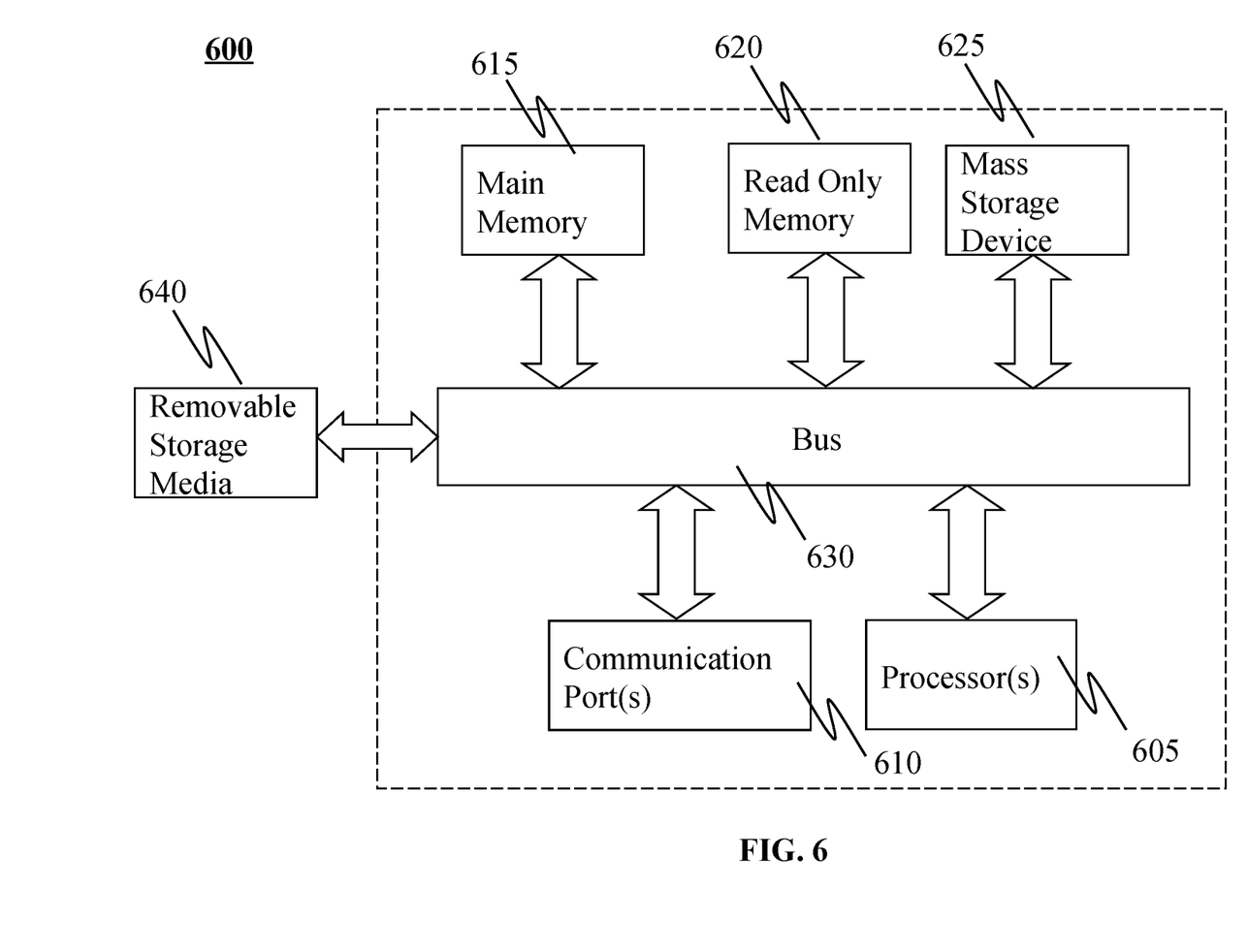
FIG. 6 illustrates an exemplary computer system in which or with which embodiments of the present invention may be utilized.

FIG. 6 is an exemplary computer system in which or with which embodiments of the present invention may be utilized. In an embodiment, computer system 600 represents a network security device (e.g., network security device 300, such as a transparent gateway) that, among other things, performs NTP request and response processing to detect and mitigate NTP request and/or response flooding. Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown in the figure, computer system 600 includes an external storage device 610, a bus 620, a main memory 630, a read only memory 640, amass storage device 650, communication port 660, and a processor 670. Those skilled in the art appreciate that computer system 600 may include more than one processor and communication ports.

Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention. Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system 600 connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g., start-up or BIOS instructions for processor 670.

Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 670 to software system. Optionally, operator and administrative interfaces, e.g. a display, keyboard, and a cursor control device, may also be coupled to bus 620 to support direct operator interaction with computer system 600. Other operator and administrative interfaces (not shown) can be provided through network connections connected through communication port 610.

External storage device 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Although embodiments of the present invention and their various advantages have been described in detail, it should be understood that the present invention is not limited to or defined by what is shown or discussed herein.

Moreover, as one skilled in the art will appreciate, any digital computer systems can be configured or otherwise programmed to implement the methods and apparatuses disclosed herein, and to the extent that a particular digital computer system is configured to implement the methods and apparatuses of this invention, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

What is claimed is:

1. A method comprising:
    maintaining, by a network security device protecting a private network, a tracking table containing information regarding network time protocol (NTP) requests originated by any of a plurality of clients associated with the private network and observed by the network security device;
    intercepting, by the network security device, an NTP request sent from a first client of the plurality of clients to a first NTP server external to the private network;
    mitigating, by the network security device, an NTP request flooding attack on the first NTP server by the first client by:
        determining based on the tracking table whether a prior NTP request directed to the first NTP server and for which an NTP response has yet to be received was sent by the first client within a predetermined or configurable time period of the NTP request; and
        when said determining is affirmative, dropping the NTP request.

2. The method of claim 1 further comprising when said determining is negative, allowing the NTP request to be transmitted to the first NTP server.

3. The method of claim 1, wherein said maintaining, by a network security device protecting a private network, a tracking table further comprises for each observed NTP request of the observed NTP requests, storing, by the network security device, a hash value of a 3-tuple of the observed NTP request, wherein the 3-tuple includes a source internet protocol (IP) address, a source port and a destination IP address the tracking table.

4. The method of claim 3, wherein said determining based on the tracking table whether a prior NTP request directed to the first NTP server and for which an NTP response has yet to be received was sent by the first client within a predetermined or configurable time period of the NTP request comprises determining whether a 3-tuple of the NTP request is already in the tracking table.

5. The method of claim 4, further comprising:
    when said determining whether a 3-tuple of the NTP request is already in the tracking table is negative, then adding, by the network security device, the 3-tuple of the NTP request to the tracking table; and
    removing, by the network security device, the 3-tuple of the NTP request from the tracking table when an NTP response to the NTP request is observed by the network security device or responsive to the 3-tuple of the NTP request having been in the table for greater than or equal to the predetermined or configurable time period.

6. The method of claim 1, further comprising mitigating, by the network security device, an NTP response flooding attack on the protected network by:
    intercepting an NTP response from the first NTP server or a second NTP server to the first client or a second client of the plurality of clients;
    determining whether the NTP response is an unsolicited NTP response based on existence or non-existence of a matching NTP request in the tracking table;
    when said determining whether the NTP response is an unsolicited NTP response is affirmative, then dropping, by the network security device, the unsolicited NTP response; and
    when said determining whether the NTP response is an unsolicited NTP response is negative, then allowing, by the network security device, the NTP response to be transmitted to its destination.

7. The method of claim 6, further comprising:
    maintaining, by the network security device, a legitimate NTP requester table;
    allowing, by the network security device, the NTP request if an originating client of the NTP request is in the legitimate NTP requester table during an NTP request flood; and
    dropping, by the network security device, the NTP request if the originating client of the NTP request is not in the legitimate NTP requester table during the NTP request flood.

8. The method of claim 7, further comprising when a legitimate NTP response to the originating client is allowed, then adding, by the network security device, the originating client to the legitimate NTP requester table.

9. A non-transitory computer-readable storage medium embodying a set of instructions, which when executed by one or more processors of a network security device protecting a private network perform a method comprising:
    maintaining a tracking table containing information regarding network time protocol (NTP) requests originated by any of a plurality of clients associated with the private network and observed by the network security device;
    intercepting an NTP request sent from a first client of the plurality of clients to a first NTP server external to the private network;
    mitigating, by the network security device, an NTP request flooding attack on the first NTP server by the first client by:
        determining based on the tracking table whether a prior NTP request directed to the first NTP server and for which an NTP response has yet to be received was sent by the first client within a predetermined or configurable time period of the NTP request; and
        when said determining is affirmative, dropping the NTP request.

10. The non-transitory computer-readable storage medium of claim 9, wherein the method further comprises when said determining is negative, allowing the NTP request to be transmitted to the first NTP server.

11. The non-transitory computer-readable storage medium of claim 9, wherein said maintaining a tracking table further comprises for each observed NTP request of the observed NTP requests, storing a hash value of a 3-tuple of the observed NTP request, wherein the 3-tuple includes a source internet protocol (IP) address, a source port and a destination IP address the tracking table.

12. The non-transitory computer-readable storage medium of claim 11, wherein said determining based on the tracking table whether a prior NTP request directed to the first NTP server and for which an NTP response has yet to be received was sent by the first client within a predetermined or configurable time period of the NTP request comprises determining whether a 3-tuple of the NTP request is already in the tracking table.

13. The non-transitory computer-readable storage medium of claim 12, wherein the method further comprises:
when said determining whether a 3-tuple of the NTP request is already in the tracking table is negative, then adding the 3-tuple of the NTP request to the tracking table; and
removing the 3-tuple of the NTP request from the tracking table when an NTP response to the NTP request is observed by the network security device or responsive to the 3-tuple of the NTP request having been in the table for greater than or equal to the predetermined or configurable time period.

14. The non-transitory computer-readable storage medium of claim 9, wherein the method further comprises mitigating an NTP response flooding attack on the protected network by:
intercepting an NTP response from the first NTP server or a second NTP server to the first client or a second client of the plurality of clients;
determining whether the NTP response is an unsolicited NTP response based on existence or non-existence of a matching NTP request in the tracking table;
when said determining whether the NTP response is an unsolicited NTP response is affirmative, then dropping the unsolicited NTP response; and
when said determining whether the NTP response is an unsolicited NTP response is negative, then allowing the NTP response to be transmitted to its destination.

15. The non-transitory computer-readable storage medium of claim 14, wherein the method further comprises:
maintaining a legitimate NTP requester table;
allowing the NTP request if an originating client of the NTP request is in the legitimate NTP requester table during an NTP request flood; and
dropping the NTP request if the originating client of the NTP request is not in the legitimate NTP requester table during the NTP request flood.

16. The non-transitory computer-readable storage medium of claim 15, wherein the method further comprises when a legitimate NTP response to the originating client is allowed, then adding the originating client to the legitimate NTP requester table.

17. A network security device comprising:
a processing resource; and
a non-transitory computer-readable medium, coupled to the processing resource, having stored therein instructions that when executed by the processing resource cause the processing resource to:
maintain a tracking table containing information regarding network time protocol (NTP) requests originated by any of a plurality of clients associated with a private network protected by the network security device and observed by the network security device;
intercept an NTP request sent from a first client of the plurality of clients to a first NTP server external to the private network;
mitigate an NTP request flooding attack on the first NTP server by the first client by:
determining based on the tracking table whether a prior NTP request directed to the first NTP server and for which an NTP response has yet to be received was sent by the first client within a predetermined or configurable time period of the NTP request; and
when said determining is affirmative, dropping the NTP request.

18. The network security device of claim 17, wherein the instructions further cause the processing resource to when said determining is negative, allowing the NTP request to be transmitted to the first NTP server.

19. The network security device of claim 17, wherein maintaining the tracking table involves for each observed NTP request of the observed NTP requests, storing a hash value of a 3-tuple of the observed NTP request, wherein the 3-tuple includes a source internet protocol (IP) address, a source port and a destination IP address the tracking table.

20. The network security device of claim 19, wherein said determining based on the tracking table whether a prior NTP request directed to the first NTP server and for which an NTP response has yet to be received was sent by the first client within a predetermined or configurable time period of the NTP request comprises determining whether a 3-tuple of the NTP request is already in the tracking table.

21. The network security device of claim 20, the instructions further cause the processing resource to:
when said determining whether a 3-tuple of the NTP request is already in the tracking table is negative, add the 3-tuple of the NTP request to the tracking table; and
when an NTP response to the NTP request is observed by the network security device or when the 3-tuple of the NTP request has been in the table for greater than or equal to the predetermined or configurable time period, remove the 3-tuple of the NTP request from the tracking table.

22. The network security device of claim 17, wherein the instructions further cause the processing resource to:
intercept an NTP response from the first NTP server or a second NTP server to the first client or a second client of the plurality of clients;
when the NTP response is determined to be an unsolicited NTP response based on existence or non-existence of a matching NTP request in the tracking table, drop the unsolicited NTP response; and
when the NTP response is determined to be a solicited NTP response based on existence or non-existence of the matching NTP request, allow the NTP response to be transmitted to its destination.

23. The network security device of claim 22, wherein the instructions further cause the processing resource to:
maintain a legitimate NTP requester table;
allow the NTP request when an originating client of the NTP request is in the legitimate NTP requester table during an NTP request flood; and
drop the NTP request when the originating client of the NTP request is not in the legitimate NTP requester table during the NTP request flood.

24. The network security device of claim 23, wherein the instructions further cause the processing resource to when a legitimate NTP response to the originating client is allowed, add the originating client to the legitimate NTP requester table.

* * * * *